United States Patent
Vogel et al.

(10) Patent No.: US 10,140,269 B2
(45) Date of Patent: Nov. 27, 2018

(54) VIEWING EFFECTS OF PROPOSED CHANGE IN DOCUMENT BEFORE COMMITTING CHANGE

(71) Applicant: Microsoft Technology Licensing, LLC, Redmond, WA (US)

(72) Inventors: Matthew Vogel, Seattle, WA (US); Avijit Sinha, Newcastle, WA (US); Olivier Destrebecq, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 186 days.

(21) Appl. No.: 13/796,545

(22) Filed: Mar. 12, 2013

(65) Prior Publication Data

US 2014/0281867 A1    Sep. 18, 2014

(51) Int. Cl.
    *G06F 17/00*      (2006.01)
    *G06F 17/22*      (2006.01)
    *G06F 17/24*      (2006.01)

(52) U.S. Cl.
    CPC ........ *G06F 17/2288* (2013.01); *G06F 17/246* (2013.01)

(58) Field of Classification Search
    CPC ... G06F 17/246; G06F 17/245; G06F 17/2288
    USPC .......... 715/212, 220, 255, 213, 229
    See application file for complete search history.

(56) References Cited

U.S. PATENT DOCUMENTS

| | | | |
|---|---|---|---|
| 5,303,146 A | 4/1994 | Ammirato et al. | |
| 5,819,293 A * | 10/1998 | Comer | G06F 17/243 |
| 5,842,180 A * | 11/1998 | Khanna | G06Q 40/12 |
| | | | 705/30 |
| 5,890,174 A * | 3/1999 | Khanna | G06F 17/246 |
| | | | 715/209 |
| 6,256,649 B1 * | 7/2001 | Mackinlay | G06F 17/246 |
| | | | 345/473 |

(Continued)

FOREIGN PATENT DOCUMENTS

| | | |
|---|---|---|
| CN | 1570919 A | 1/2005 |
| CN | 1588352 A | 3/2005 |

(Continued)

OTHER PUBLICATIONS

Ma, User Interfaces for Managing and Exploring Scientific Visualization Data, IEEE Oct. 2000, pp. 16-19.*

(Continued)

*Primary Examiner* — Cong-Lac Huynh

(57) ABSTRACT

A tweak and view mode may be used by a user to see an effect of a proposed change to a document before the change is committed to the document. The application may automatically navigate to different portions of the document and/or display different sections of the document. Instead of the user having to search for the portion of the document affected by the change, the changed portions are determined for the user. The portions may be automatically displayed to the user and/or the user may determine when to move to each different portion that changed as a result of the proposed change. The proposed change may be accepted/rejected by the user. For example, a User Interface (UI) element may be selected by the user to either accept the change or reject the change.

18 Claims, 10 Drawing Sheets

(56) References Cited

U.S. PATENT DOCUMENTS

| | | | | |
|---|---|---|---|---|
| 6,292,810 B1* | 9/2001 | Richards | ............... | G06F 17/246 707/999.1 |
| 6,311,192 B1* | 10/2001 | Rosenthal et al. | | |
| 6,438,565 B1* | 8/2002 | Ammirato | ............... | G06F 3/0489 715/204 |
| 6,560,620 B1* | 5/2003 | Ching | ............... | 715/229 |
| 6,731,309 B1* | 5/2004 | Unbedacht | ............... | G06F 17/212 715/209 |
| 6,948,154 B1* | 9/2005 | Rothermel et al. | ............... | 717/128 |
| 7,130,858 B2* | 10/2006 | Ciaramitaro | ............... | G06F 17/30011 |
| 7,237,188 B1* | 6/2007 | Leung | ............... | G06F 17/211 715/209 |
| 7,373,225 B1* | 5/2008 | Grier | ............... | G05B 23/0248 340/438 |
| 7,415,664 B2* | 8/2008 | Aureglia | ............... | G06F 17/246 715/212 |
| 7,444,584 B1* | 10/2008 | Hobbs | ............... | G06F 17/246 715/212 |
| 7,496,841 B2* | 2/2009 | Hadfield | ............... | G06Q 10/10 707/999.007 |
| 7,752,536 B2 | 7/2010 | Megiddo et al. | | |
| 7,860,787 B2* | 12/2010 | Oppenheimer | ............... | G06Q 20/10 705/35 |
| 8,122,061 B1* | 2/2012 | Guinness | ............... | G06F 17/30292 706/11 |
| 8,259,134 B2 | 9/2012 | Mital et al. | | |
| 8,321,780 B2 | 11/2012 | Erwig et al. | | |
| 8,321,784 B1* | 11/2012 | Ranganathan et al. | ............... | 715/255 |
| 8,612,535 B2* | 12/2013 | da Fonseca Mendes | ............... | G06Q 10/109 707/609 |
| 8,639,613 B2* | 1/2014 | Cohen | ............... | G06Q 40/00 705/35 |
| 8,700,984 B2* | 4/2014 | Siegel | ............... | G06F 17/211 715/230 |
| 8,725,604 B2* | 5/2014 | Knighton | ............... | G06Q 10/06 705/31 |
| 8,744,889 B1* | 6/2014 | Foss | ............... | G06Q 10/06 705/7.12 |
| 8,893,220 B2* | 11/2014 | Bastide | ............... | G06F 17/30011 726/1 |
| 8,996,981 B2* | 3/2015 | Patton | ............... | G06F 17/243 715/221 |
| 9,002,935 B1* | 4/2015 | Ho | ............... | G06F 17/30967 709/204 |
| 9,098,473 B2* | 8/2015 | Dukhon | ............... | G06F 3/0481 |
| 9,229,919 B1* | 1/2016 | Krappe | ............... | G06F 17/2211 |
| 9,398,290 B2* | 7/2016 | Hasegawa | ............... | H04N 13/0409 |
| 9,684,646 B2* | 6/2017 | Coblenz | ............... | G06F 17/245 |
| 9,734,139 B2* | 8/2017 | Reeves | ............... | G06F 17/246 |
| 9,740,666 B1* | 8/2017 | Galante | ............... | G06F 17/212 |
| 2002/0023105 A1* | 2/2002 | Wisniewski | ............... | G06F 17/246 715/212 |
| 2002/0055948 A1 | 5/2002 | Breuer et al. | | |
| 2003/0041063 A1* | 2/2003 | Brady | ............... | 707/10 |
| 2004/0103366 A1* | 5/2004 | Peyton-Jones | ............... | G06F 17/246 715/213 |
| 2004/0163050 A1* | 8/2004 | Matter | ............... | 715/530 |
| 2004/0205653 A1* | 10/2004 | Hadfield | ............... | G06Q 10/10 715/255 |
| 2005/0289459 A1* | 12/2005 | Walton | ............... | G09B 5/06 715/201 |
| 2007/0192677 A1* | 8/2007 | O'Leary | ............... | G06Q 10/00 715/212 |
| 2007/0220416 A1* | 9/2007 | Mitsui | ............... | 715/503 |
| 2008/0028288 A1 | 1/2008 | Vayssiere et al. | | |
| 2009/0193035 A1* | 7/2009 | Benayon | ............... | G06F 17/30011 |
| 2009/0199090 A1* | 8/2009 | Poston | ............... | G06F 17/30997 715/255 |
| 2009/0316977 A1* | 12/2009 | Juncker | ............... | G06Q 40/12 382/133 |
| 2010/0122218 A1* | 5/2010 | Mahadevan | ............... | G06Q 10/06 715/853 |
| 2010/0174678 A1 | 7/2010 | Massand | | |
| 2010/0321709 A1* | 12/2010 | Eastman | ............... | G06K 9/00442 358/1.9 |
| 2011/0252300 A1* | 10/2011 | Lloyd et al. | ............... | 715/217 |
| 2012/0066574 A1* | 3/2012 | Lee | ............... | G06F 17/246 715/202 |
| 2012/0133989 A1* | 5/2012 | Glover | ............... | G06F 17/2211 358/1.18 |
| 2012/0179647 A1* | 7/2012 | Crucs | ............... | G06F 17/24 707/608 |
| 2012/0185449 A1* | 7/2012 | Gould | ............... | G06F 17/30371 707/695 |
| 2012/0192051 A1* | 7/2012 | Rothschiller | ............... | G06F 17/211 715/217 |
| 2012/0233137 A1* | 9/2012 | Jakobson et al. | ............... | 707/695 |
| 2012/0262361 A1* | 10/2012 | Kitagawa et al. | ............... | 345/2.2 |
| 2012/0275309 A1* | 11/2012 | Jalil | ............... | H04L 45/124 370/238 |
| 2013/0097490 A1* | 4/2013 | Kotler et al. | ............... | 715/255 |
| 2013/0124952 A1* | 5/2013 | Frem et al. | ............... | 715/202 |
| 2013/0151421 A1* | 6/2013 | Van Der Ploeg | ............... | G06Q 10/06 705/301 |
| 2013/0191714 A1* | 7/2013 | Rothschiller | ............... | G06F 17/243 715/226 |
| 2013/0219256 A1* | 8/2013 | Lloyd | ............... | G06F 17/2247 715/212 |
| 2013/0282406 A1* | 10/2013 | Snyder | ............... | G06Q 40/08 705/4 |
| 2013/0326330 A1* | 12/2013 | Harris | ............... | G06F 17/24 715/234 |
| 2014/0081995 A1* | 3/2014 | Martin | ............... | G06F 17/30675 707/750 |
| 2014/0108266 A1* | 4/2014 | Dawe | ............... | G06Q 50/188 705/80 |
| 2014/0149857 A1* | 5/2014 | Vagell | ............... | G06F 17/24 715/255 |
| 2014/0173423 A1* | 6/2014 | Meisels et al. | ............... | 715/255 |
| 2014/0223276 A1* | 8/2014 | Chavoustie | ............... | G06F 17/246 715/212 |
| 2014/0279681 A1* | 9/2014 | Cole | ............... | 705/36 R |
| 2014/0372369 A1* | 12/2014 | Babanov | ............... | G06F 17/30165 707/608 |
| 2015/0058932 A1* | 2/2015 | Faitelson et al. | ............... | 726/3 |
| 2015/0193405 A1* | 7/2015 | Gensburg | ............... | G06F 11/3692 715/220 |
| 2017/0242836 A1* | 8/2017 | Marez | ............... | G06F 17/246 |

FOREIGN PATENT DOCUMENTS

| | | |
|---|---|---|
| CN | 102096660 A | 6/2011 |
| CN | 102566851 A | 7/2012 |
| CN | 102566922 A | 7/2012 |
| CN | 102804162 A | 11/2012 |
| CN | 102945226 A | 2/2013 |
| EP | 615200 A2 | 9/1994 |
| EP | 1204053 A1 | 5/2002 |
| WO | 2011130283 A1 | 10/2011 |

OTHER PUBLICATIONS

Nurmuliani et al., Analysis of Requirements Volatility during Software Development Life Cycle, IEEE 2004, pp. 1-10.*

Shiozawa et al., 3D Interactive Visualization for Inter-Cell Dependencies of Spreadsheets, IEEE 1999, pp. 1-4.*

Cadiz et al., Using Web Annotations for Asynchronous Collaboration around Documents, ACM 2000, pp. 309-318.*

Alter, Service System Fundamentals: Work System, Value Chain, and Life Cycle, IEEE 2008, pp. 71-85.*

Kongdenfha et al., Rapid Development of Spreadsheet-based Web Mashups, ACM 2009, pp. 851-860.*

Mangiante et al., SpreadComp Platform: a New Paradigm for Distributed Spreadsheet Collaboration and Composition, IEEE 2012, pp. 297-305.*

(56) References Cited

OTHER PUBLICATIONS

"Editing and Formatting your Chart", Retrieved on: Feb. 8, 2013, 2 pages, Available at: http://support.google.com/drive/bin/answer.py?hl=en&answer=63824.

"Advanced Functionality of the Spreadsheet Component", Retrieved on: Feb. 8, 2013, 7 pages, Available at: http://flylib.com/books/en/3.207.1.17/1/.

"Written Opinion Issued in PCT Patent Application No. PCT/US2014/019641", dated Jun. 29, 2015, 10 Pages.

"International Search Report and Written Opinion Issued in PCT Patent Application No. PCT/US2014/019641", dated Feb. 6, 2015, 11 Pages.

"First Office Action and Search Report Issued in Chinese Patent Application No. 201480013710.6", dated Mar. 3, 2017, 12 Pages.

"Notice of Allowance Issued in Chinese Patent Application No. 201480013710.6", dated Mar. 20, 2018, 7 Pages.

"International Preliminary Report on Patentability Issued in PCT Application No. PCT/US2014/019641", dated Aug. 12, 2015, 11 Pages.

* cited by examiner

VIEWING EFFECTS OF PROPOSED CHANGE IN DOCUMENT BEFORE COMMITTING CHANGE

BACKGROUND

Viewing the effects of possible changes to a document (e.g. a spreadsheet) can be difficult. For example, if a user wants to see how a possible change affects a document, the user may make a copy of the document and make a change to the copy of the document to see how changes affect a document. Viewing proposed changes to a document that is shared between users can be even more challenging.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A tweak and view mode may be used by a user to see an effect of a proposed change on a document before the change is committed to the document. The change may affect one or more portions of the document. For example, a change to a value in a cell of a spreadsheet may affect one or more charts, cells and/or other objects that are associated with the spreadsheet. Instead of the user having to search for the portion(s) of the document affected by the change, the changed portions may be determined for the user. The portions may be automatically displayed to the user and/or the user may determine when to move to each different portion that changed as a result of the proposed change. For example, in response to changing one or more values within one portion of the document, the application may show one or more graphs that changed and/or show a comparison of each portion. The proposed change may be accepted/rejected by the user. For example, a User Interface (UI) element may be selected by the user to either accept the change or reject the change.

DETAILED DESCRIPTION

Figure 1:
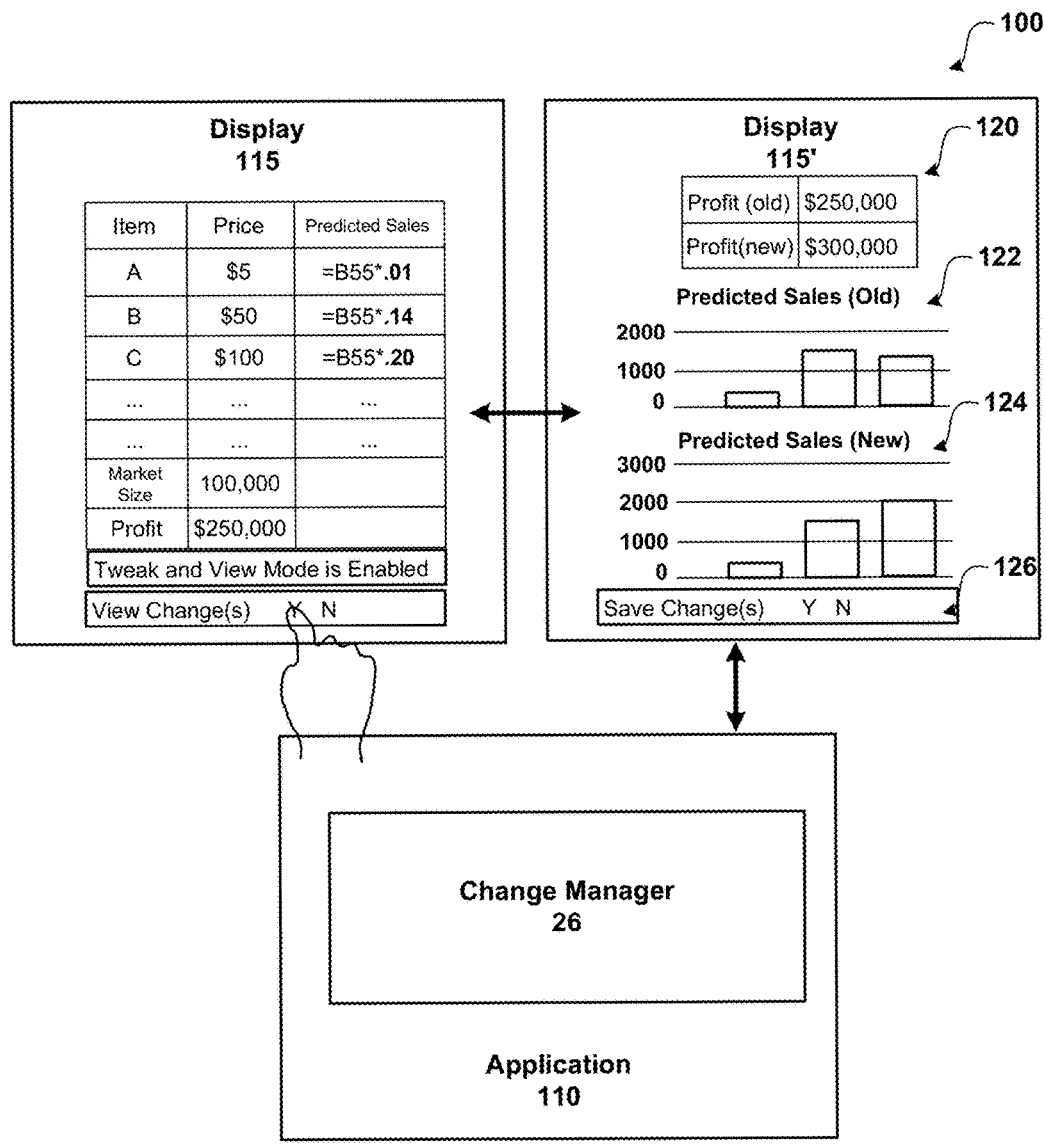
FIG. 1 shows a system for using a tweak and view mode before committing a change to a document.

Referring now to the drawings, in which like numerals represent like elements, various embodiment will be described.

FIG. 1 shows a system for using a tweak and view mode before committing a change to a document. As illustrated, system 100 includes application 110, change manager 26 and touch screen input display 115.

In order to facilitate communication with the change manager 26, one or more callback routines, may be implemented. According to an embodiment, application 110 is a business productivity application, such as a spreadsheet application, that is configured to receive input from a touch-sensitive input display 115 and/or keyboard input (e.g. a physical keyboard and/or SIP) and/or other types of input (e.g. speech and/or some other input sensing). For example, change manager 26 may provide information to application 110 in response to a user's input such as editing a cell, selecting an element to edit a value, and the like.

System 100 as illustrated comprises a touch screen input display 115 that detects when a touch input has been received (e.g. a finger touching or nearly touching the touch screen). Display 115 may detect input, such as: a pinch gesture; a stretch gesture; a select gesture (e.g. a tap action on a displayed element); a select and hold gesture (e.g. a tap and hold gesture received on a displayed element); a swiping action and/or dragging action and/or double tap; and the like. Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

Change manager 26 is configured to enter/exit a tweak and view mode that may be used by a user to see an effect of a proposed change on a document before the change is committed to the document. The change may affect one or more portions of the document.

In the current example, display 115 shows that the "Tweak and View Mode is Enabled" that provides an indication to the user that any changes made to the current spreadsheet, are not committed (e.g. saved) to the spreadsheet until a confirmation of commitment is received. As illustrated, a user has changed three cells to include values 0.01, 0.14, and 0.20. The changed values may/may not be distinguished from unchanged values (e.g. bolded, highlighted, line drawn around values, . . . ). When the user would like to see how the changes affected other parts of the spreadsheet, the user may select to view the changes (e.g. selecting a user interface element, saying a command, performing a gesture, and the like). For example, a change to a value in a cell of the spreadsheet may affect one or more charts and/or other objects that are associated with the spreadsheet. Instead of the user having to search for the portion of the document affected by the change, the changed portions may be determined for the user.

In response to selecting to view the changes, display 115 is updated as shown in display 115'. The portions showing the changed portion(s) may be automatically displayed to the user and/or the user may determine when to move to each different portion that changed as a result of the proposed change. In the current example, change manager 26 instructs the application to show a comparison of the data before the change (Profit(old) in table 120 and graph 122) to data after the change (Profit(new) in table 120 and graph 124). Other display methods may be used to show the changed portions. For example, each portion of the document affected by the change may be shown independently without a comparison of data. According to an embodiment, a ordering is made as to what portion of the document was affected by the change more than other portions of the document. The ordering may be used when displaying the changed portions to the user.

The proposed change(s) may be accepted/rejected by the user. For example, a User Interface (UI) element 126 may be selected by the user to either accept the change or reject the change. More details and examples regarding the tweak and view mode are provided below.

Figure 2:
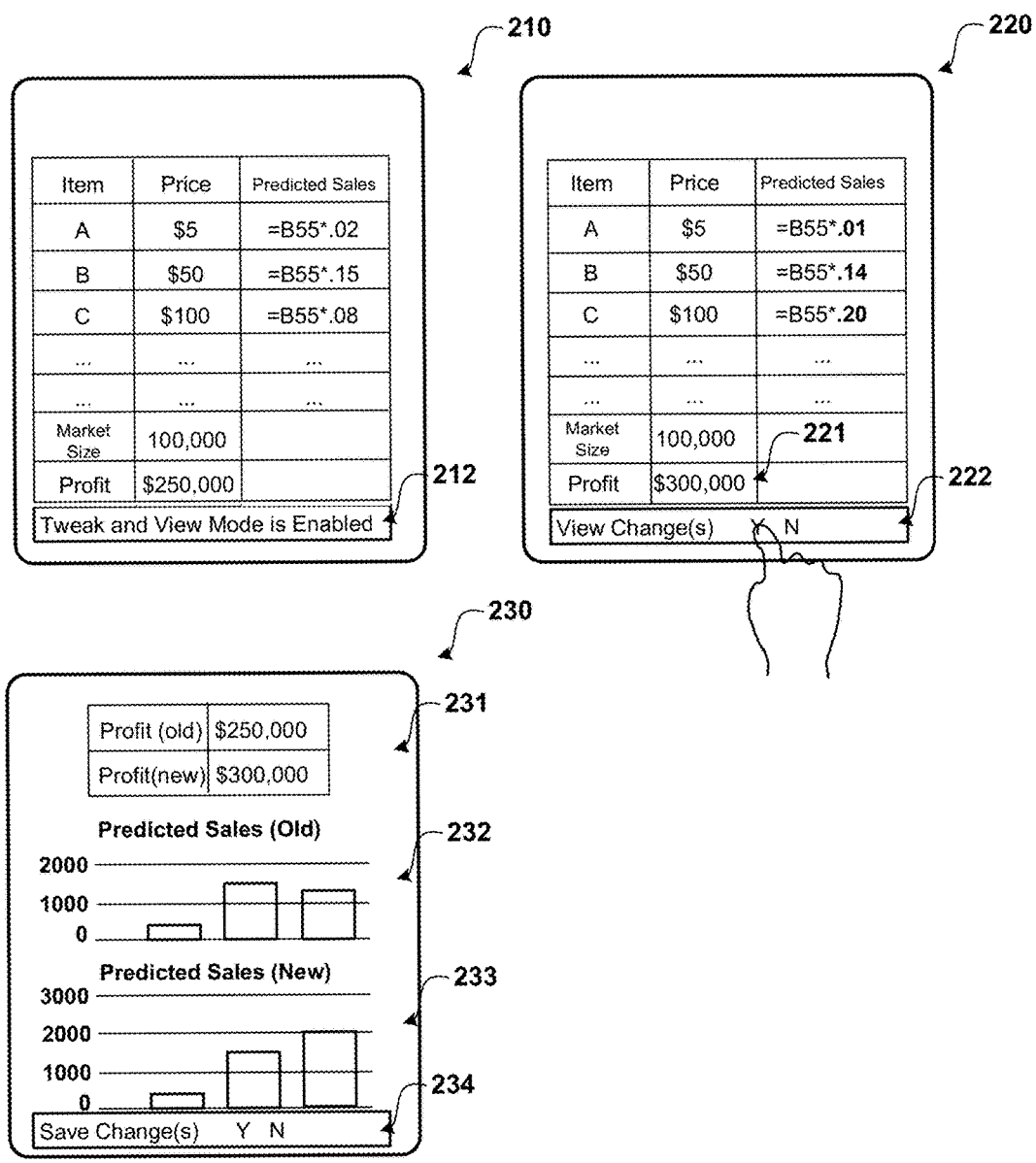
FIG. 2 shows making and viewing proposed changes using a comparison view while in a tweak and view mode.

FIG. 2 shows making and viewing proposed changes using a comparison view while in a tweak and view mode. As illustrated, FIG. 2 includes three different displays (210, 220 and 230) that illustrate before making a proposed change(s), making a proposed change(s) and viewing the proposed change(s) while in tweak and view mode.

The displays may be shown on displays having a standard/large display (e.g. displays larger than 12 inches) as well as a device having a limited display size (e.g. a cell phone having a display of approximately 2 by 3 inches, a slate/tablet having approximately a 7-10 inch display, and/or other devices having other display sizes (e.g. 4, 5, 6, . . . ). The displays may also be shown on a touch screen.

Display 210 shows a display of content (e.g. spreadsheet data) before a proposed change is entered (e.g. a first version state). In the current example, the user has entered the tweak and view mode (e.g. by saying a command, selecting a UI element, performing a gesture, . . . ) but has not yet made a proposed change.

Display 220 shows the display of spreadsheet data after proposed changes are made (e.g. a second version state). In the current example, the user has changed value 0.02 to 0.01, value 0.15 to 0.14 and value 0.08 to 0.20 in the predicted sales column. More/fewer changes may be made. Proposed changes may also be made in portions of the document not currently shown on the display. The proposed changes may/may not be distinguished from the other data in the document (e.g. bolded, highlighted, line drawn around values, . . . ). In the current example, the proposed changes are bolded. Data affected by the change(s) may also be indicated. For example, the cell including the Profit 221 that is affected by the change may be displayed differently to show that it is affected by the proposed change.

Display 230 shows a view of different portion of the document showing the proposed changes. Display 230 shows a comparison of the data before the change (Profit (old) in table 231 and graph 232) to data after the change (Profit(new) in table 231 and graph 233). Other display methods may be used to show the changed portions (e.g. See FIGS. 3 and 4). According to an embodiment, the use selects UI element 222 to show the changes.

The user may commit the changes to the document or decide not to commit the changes to the document. According to an embodiment, the user make a selection on UI element 234 to either save the changes or not save the changes. Other methods may be used to commit the changes (e.g. voice command, gesture, . . . ).

Figure 3:
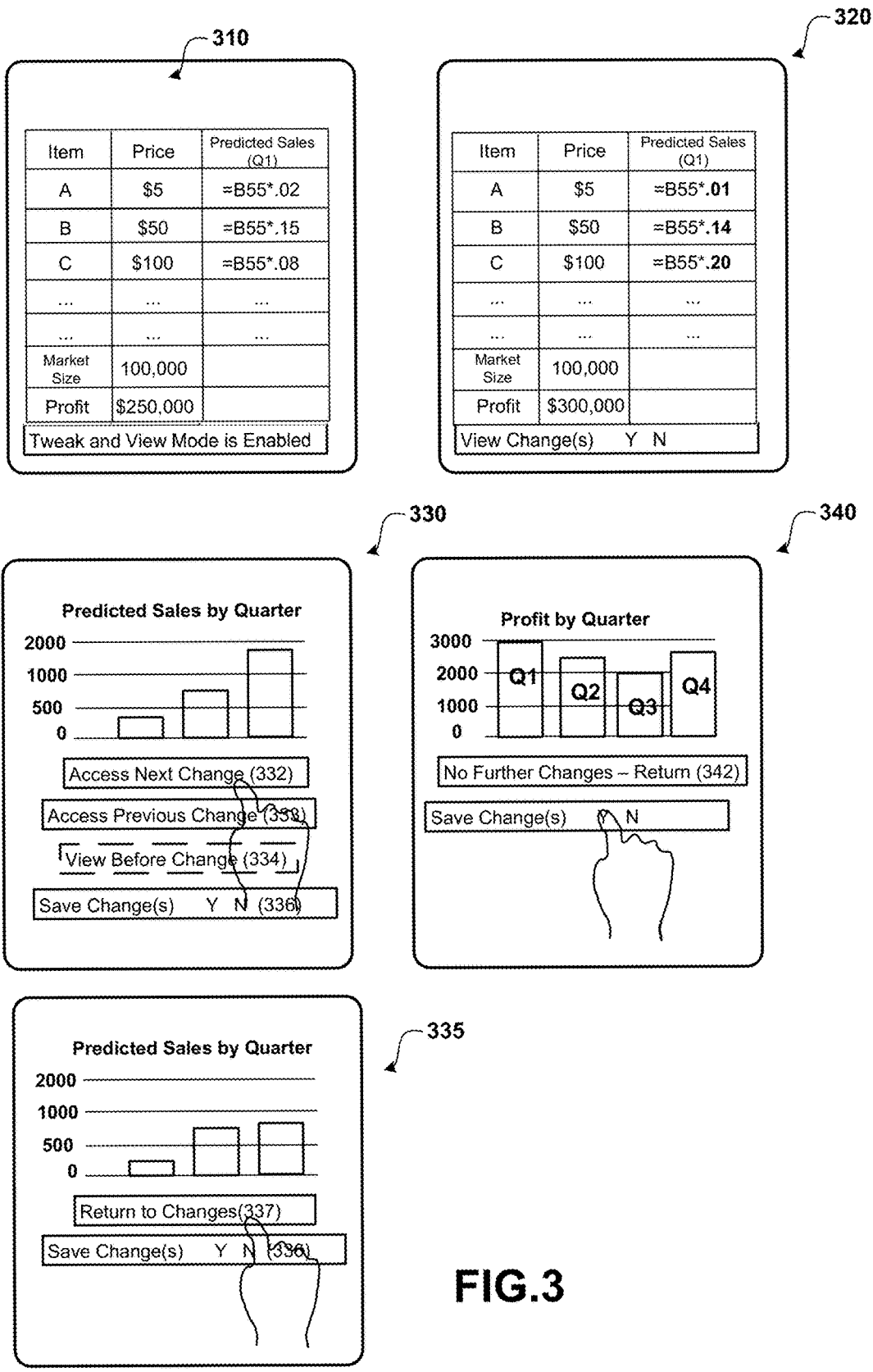
FIG. 3 shows making and viewing proposed changes while in a tweak and view mode.

FIG. 3 shows making and viewing proposed changes while in a tweak and view mode. As illustrated, FIG. 3 includes five different displays (310, 320, 330, 335 and 340) that illustrate before making a proposed change(s), making a proposed change(s) and viewing the proposed change(s) while in tweak and view mode.

Display 310 shows a display of content (e.g. spreadsheet data) before a proposed change is entered. In the current example, the user has entered the tweak and view mode (e.g. saying a command, selecting a UI element, performing a gesture, . . . ) but has not yet made a proposed change.

Display 320 shows the display of spreadsheet data after proposed changes are made. In the current example, the user has changed value 0.02 to 0.01, value 0.15 to 0.14 and value 0.08 to 0.20 in the predicted sales column. Profit has changed from $250,000 to $300,000.

Display 330 shows a portion of the document showing affected by the proposed changes. Display 330 shows a Predicted Sales graph that changed as a result of the proposed changes.

According to an embodiment, a user may select UI element 334 to see how the chart appeared before the proposed change was made. Selecting UI element 334 (or receiving some other command) shows display 335 that shows the graph before the proposed changes were used. A user may return to the view showing the proposed changes (e.g. UI element 337) or save the changes (e.g. UI element 336).

A user may also access the next change view (when there are further changed portions to be shown) from display 330 using Access Next Change 332 (or receiving some other command) When the access next change is commanded, the display changes to display 340.

A user may also access the previous change view (to access a previous change) from display 330 using Access Previous Change 333 (or receiving some other command).

Display 340 shows another portion of the document showing affected by the proposed changes. Display 340 shows a Profit by Quarter graph that changed as a result of the proposed changes. According to an embodiment, an indication is displayed that there are no further changes. A user may select UI element 342 According to another embodiment, as discussed with regard to display 330, a user view how the graph appeared before the proposed change was made. A user may return to the changes (e.g. UI element 337) or save the changes (e.g. UI element 336).

Figure 4:
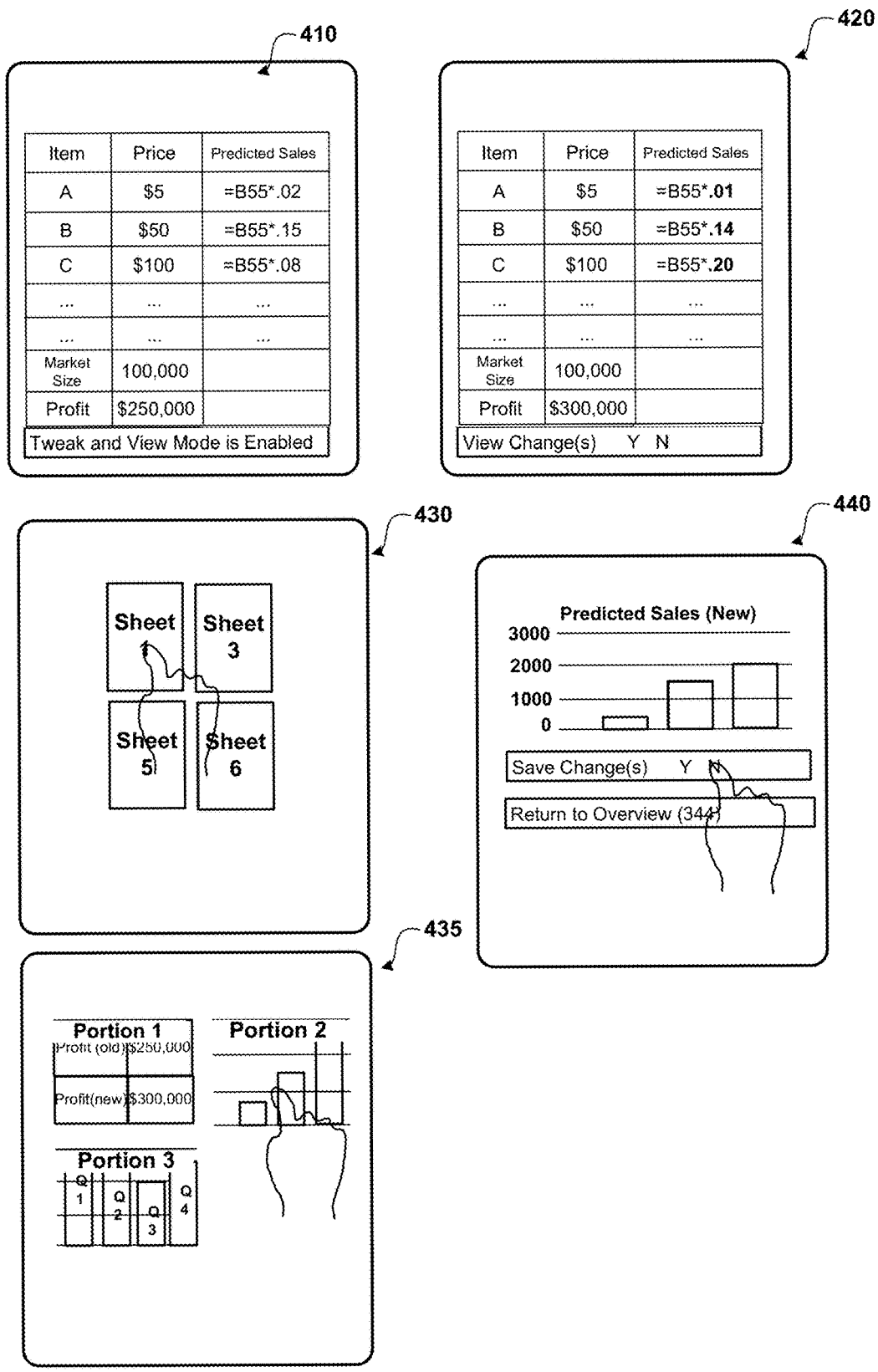
FIG. 4 shows making and viewing proposed changes while in a tweak and view mode.

FIG. 4 shows making and viewing proposed changes while in a tweak and view mode. As illustrated, FIG. 4 includes five different displays (410, 420, 430, 435 and 440) that illustrate before making a proposed change(s), making a proposed change(s) and viewing the proposed change(s) while in tweak and view mode.

Display 410 shows a display of content (e.g. spreadsheet data) before a proposed change is entered. In the current example, the user has entered the tweak and view mode (e.g. saying a command, selecting a UI element, performing a gesture, . . . ) but has not yet made a proposed change.

Display 420 shows the display of spreadsheet data after proposed changes are made. In the current example, the user has changed value 0.02 to 0.01, value 0.15 to 0.14 and value 0.08 to 0.20 in the predicted sales column.

Display 430 shows an overview of different portions of the document showing affected by the proposed changes. Display 430 shows four different sheets (Sheet 1, Sheet 3, Sheet 5 and Sheet 6) that changed as a result of the proposed changes. According to an embodiment, each thumbnail represents a sheet of a spreadsheet workbook that includes at least one portion affected by the proposed change. According to another embodiment, each thumbnail represents a portion of the content (e.g. 50%, 33%, 16% and the like). The content that is displayed in the thumbnail may be a zoomed out view of the content without changing the actual content, a zoomed out view of a modified view of the content, and/or a representation of the content. When there are larger thumbnails displayed, the content may actually be a zoomed out view of the content. As there are more thumbnails displayed in the view and the thumbnails are smaller, the level of detail in the thumbnail changes. For example, when a bar chart is converted into a thumbnail that occupies roughly half of a limited display device, the display is a zoomed out view without changing the content displayed in the thumbnail. When the size of the thumbnail goes down further, the actual content, which is a chart in this example, is replaced with a graphical icon replacing the content.

While different sheets are shown in display 430, the portions of the content may relate to different content. For example, display 435 shows another example display of portions of a document showing changes.

Display 435 shows thumbnails for different portions of the document affected by the proposed changes. As shown, each thumbnail includes a representation of the portion of the document. For example, portion 1 shows data, portion 2 shows a graph, and portion 3 shows a graph.

A user may select one of the thumbnails to see a more detailed view of the proposed change. For example, a user may select Sheet 1 in display 430 by tapping on the sheet. In response to selecting the thumbnails, the display changes to the selected portion.

Display 440 shows a Predicted Sales graph that is updated in response to the proposed changes. A user may decide to save the changes and/or return to the overview display (e.g. display 430/435).

According to an embodiment, a user may perform other gestures to move between the displays. For example, a user may perform a pinch gesture by pulling together his or her index finger and thumb to create a pinching action in order to move from display 440 to display 430/435. A user may perform a stretch gesture by spreading his or her index finger and thumb to create a stretching action in order to move from a thumbnail on display 430/435 to display 440.

Figure 5:
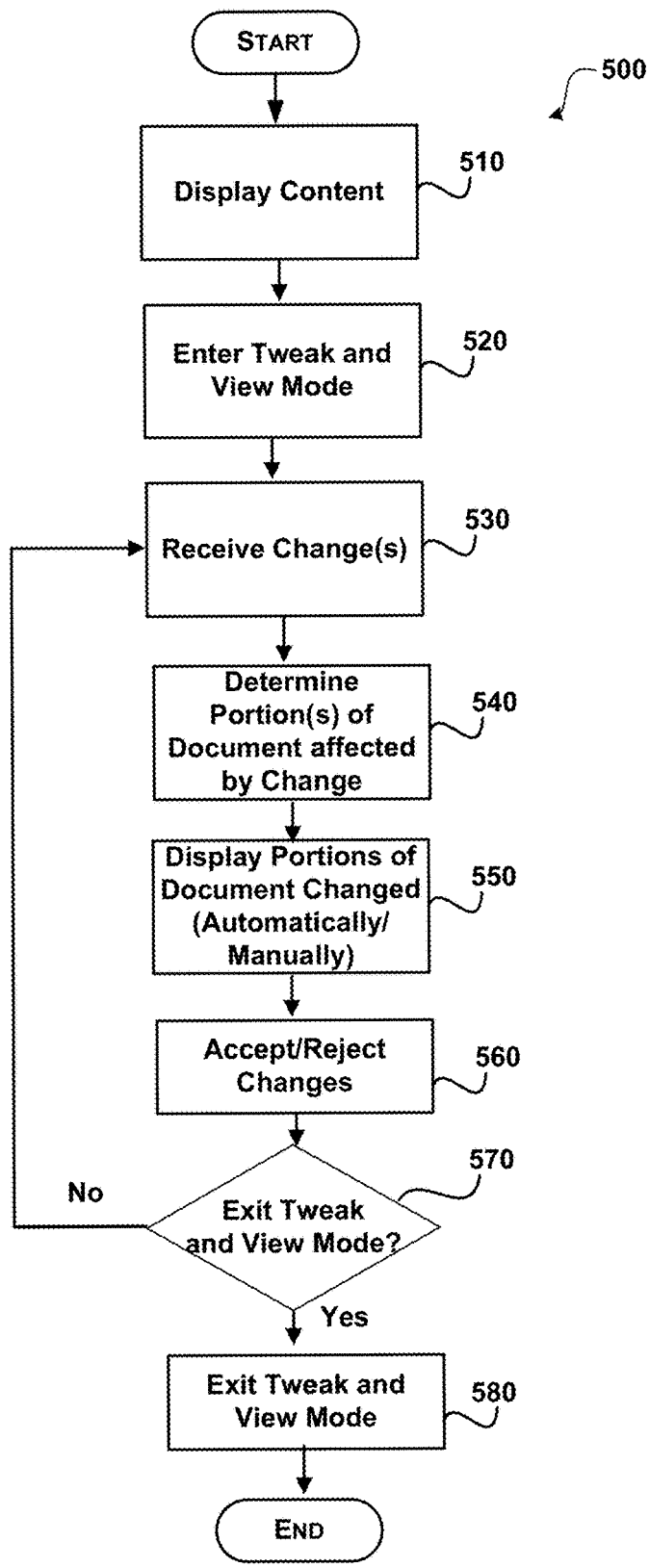
FIG. 5 shows an illustrative process for making and viewing proposed changes before the changes are committed to the document.

FIG. 5 shows an illustrative process for making and viewing proposed changes before the changes are committed to the document. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process moves to operation 510, where content is displayed. The content displayed may be different types of contents. For example, the content may be a spreadsheet, a document, a presentation, images, files, and the like. According to an embodiment, the content is a spreadsheet document that may include one or more sheets in a workbook.

Moving to operation 520, a tweak and view mode is entered. Different methods may be used to enter/exit the tweak and view mode. For example, a UI element may be selected, a user may say a command, a user may perform a gesture, and the like. While in the tweak and view mode, a user may make proposed changes and view the portions of the document that are affected by the changes before committing the proposed changes to the document.

Flowing to operation 530, one or more proposed changes are received. The proposed change(s) may affect one or more portions of the document. For example, a user may change a value in the document that affected a calculation performed in another portion of the document and also changes how two different objects (e.g. chart/graph/picture) are displayed in other portions of the document. According to an embodiment, the changes are changes to at least one value within a spreadsheet.

Transitioning to operation 540, a determination is made as to what portion(s) of the document are affected by the change. The proposed change may affect one or more portions of the document. For example, the proposed changes may affect data in one or more portions of the document as well as one or more graphical objects in one or more portions of the document. According to an embodiment, a calculation is automatically performed that determines an ordering of the portions of the document ranging from more affected to least affected. A portion of a document may be considered to be more affected based on various criteria (e.g. number of data values changed, a size of a displayed object affected by the change (e.g. chart/graph/picture), and the like. According to an embodiment, a user may define an ordering method used (e.g. a graph object before a table object, a table object before data values, and the like). According to an embodiment, the determined ordering is used when displaying the changed portions of the document to the user.

Moving to operation 550, the portion(s) of the document affected by the proposed changes are displayed. According to an embodiment, a user input is received indicating that they would like to view the changed portions of the document. The portion(s) may be automatically/manually displayed. For example, a user may manually select/advance through each of the different portions. The application may also automatically display the portions affected by the proposed changes (e.g. predetermined logic). A combination of automatic/manual navigation through the changed portions may also be used. For example, an initial display may be shown from which point specific user commands are received to navigate through the different portions affected by the change.

Flowing to operation 560, the user may accept/reject the proposed change(s). For example, a user may select a "save" UI element to commit the changes to the document or select a "do not save" UI element so that the changes are not committed to the document. According to an embodiment, a user may indicate to commit/not commit the proposed changes using other methods (e.g. verbal command, gesture, and the like.

Transitioning to decision operation 570, a determination is made as to whether to exit the tweak and view mode. For example, a UI element may be selected, a user may say a command, a user may perform a gesture, and the like to exit the tweak and view mode. When the determination is to not exit the tweak and view mode, the process returns to operation 530 to receive further proposed change(s). When the determination is to exit the tweak and view mode, the process moves to operation 580.

At operation 580, the tweak and view mode is exited. When not in tweak and view mode, changes made to the document are committed to the document.

The process then flows to an end operation and returns to processing other actions.

Figure 6:
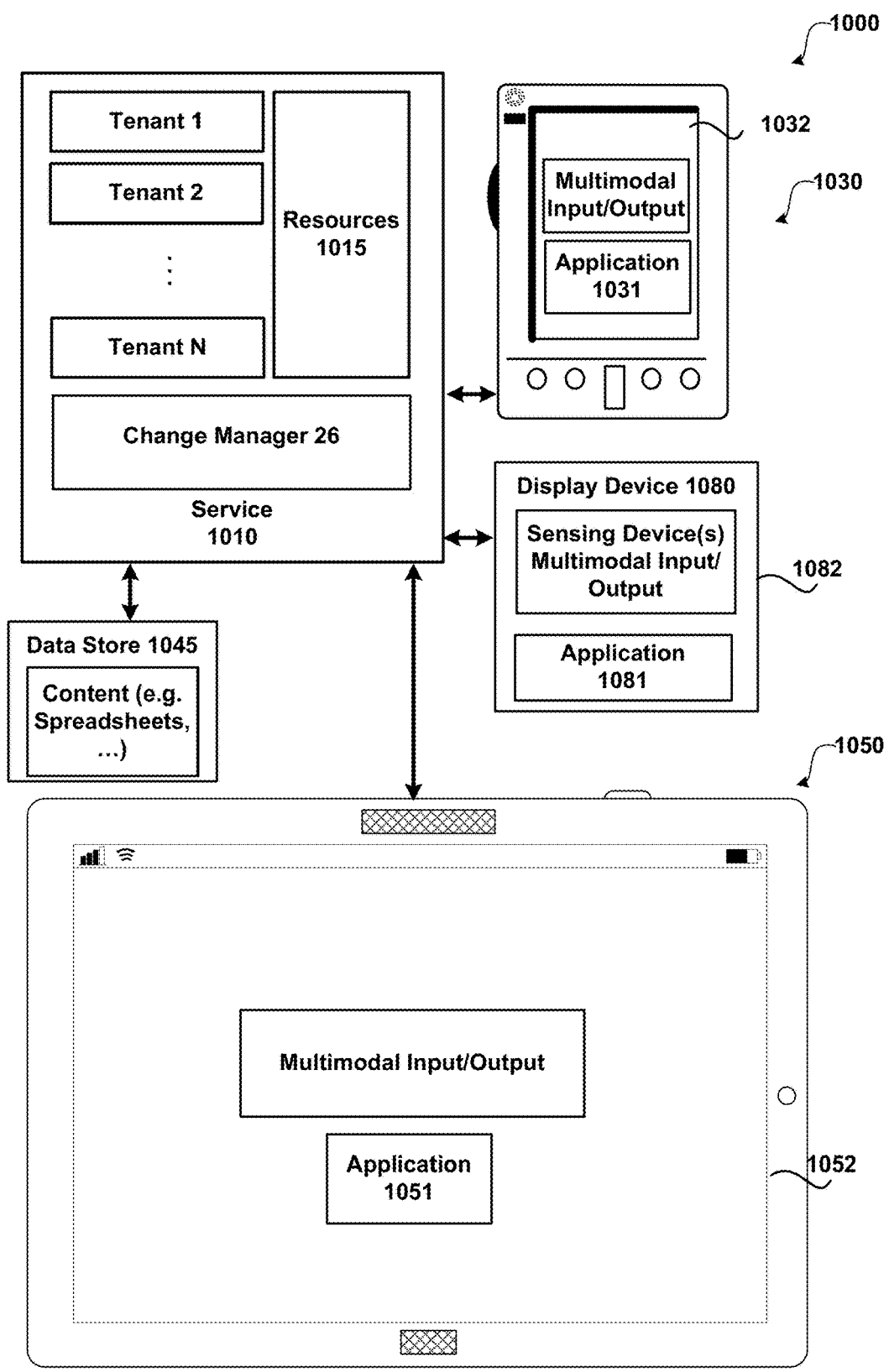
FIG. 6 illustrates an exemplary system that may use a tweak and view mode to view proposed changes.

FIG. 6 illustrates an exemplary system that may use a tweak and view mode to view proposed changes. As illustrated, system 1000 includes service 1010, data store 1045, touch screen input device 1050 (e.g. a slate), smart phone 1030, and display device 1080 (e.g. monitor/television, . . . ).

Each device (e.g. device 1050, smart phone 1030, display device) may be configured to receive input from one or more sensing devices. The sensing device may be a part of the device and/or separate from the device. The sensing device may be configured to capture user input using various input methods. A sensing device may include one or more microphones to capture spoken input (e.g. words) and one or more cameras to detect movement of a user (e.g. pictures/videos). The sensing device may also be configured to capture other inputs from a user such as by a keyboard and/or mouse (not pictured). For example, the sensing device may be a MICROSOFT KINECT® device comprising a plurality of cameras and a plurality of microphones As illustrated, service 1010 is a cloud based and/or enterprise based service that may be configured to provide spreadsheet services. The service may be configured to be interacted with using different types of input/output. For example, a user may use speech input, touch input, hardware based input, and the like. The service may provide speech output and/or sound effects. Functionality of one or more of the services/applications provided by service 1010 may also be configured as a client/server based application.

As illustrated, service 1010 is a multi-tenant service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel.

A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030, touch screen input device 1050 and device 1080 are configured with multimodal applications (1031, 1051, 1081). While the application is illustrated as part of the device, the application may be a network application (e.g. included as part of service 1010) that is stored externally from the device.

As illustrated, touch screen input device 1050, smart phone 1030 and display device 1080 shows exemplary displays 1052/1032/1082 showing the use of an application that utilize multimodal input/output (e.g. speech/graphical displays/gestures (touch/non-touch)). Data may be stored on a device (e.g. smart phone 1030, device 1050 and/or at some other location (e.g. network data store 1045). Data store 1054 may be used to store spreadsheet data used by the service. The applications used by the devices may be client based applications, server based applications, cloud based applications and/or some combination.

Change manager 26 is configured to perform operations relating to using a tweak and view mode as described herein. While manager 26 is shown within service 1010, the all/part of the functionality of the manager may be included in other locations (e.g. on smart phone 1030, device 1050 and/or display device 1080).

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
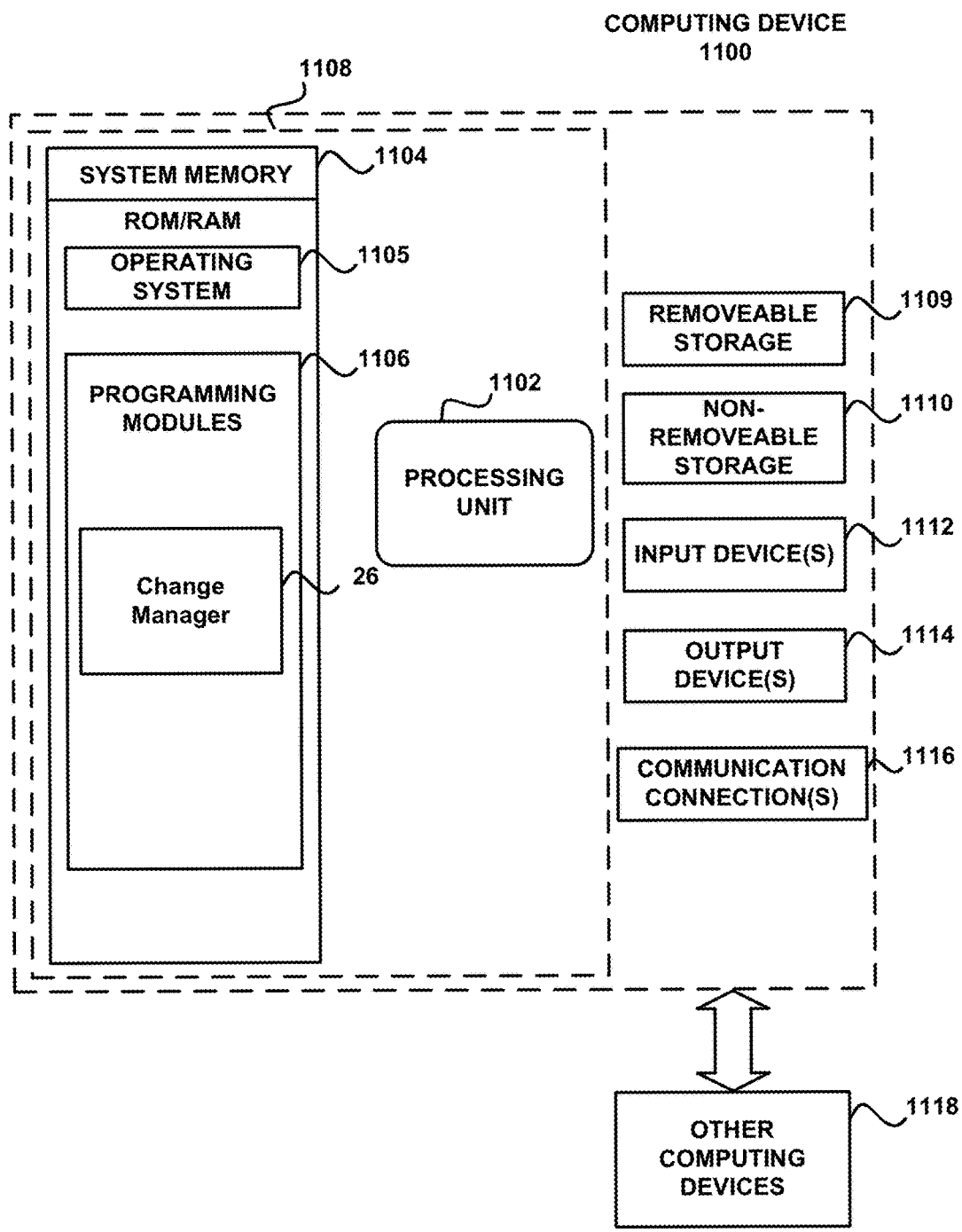
FIGS. 7, 8A, 8B, and 9 and the associated descriptions provide a discussion of a variety of operating environments in which embodiments of the invention may be practiced.
Figure 8A:
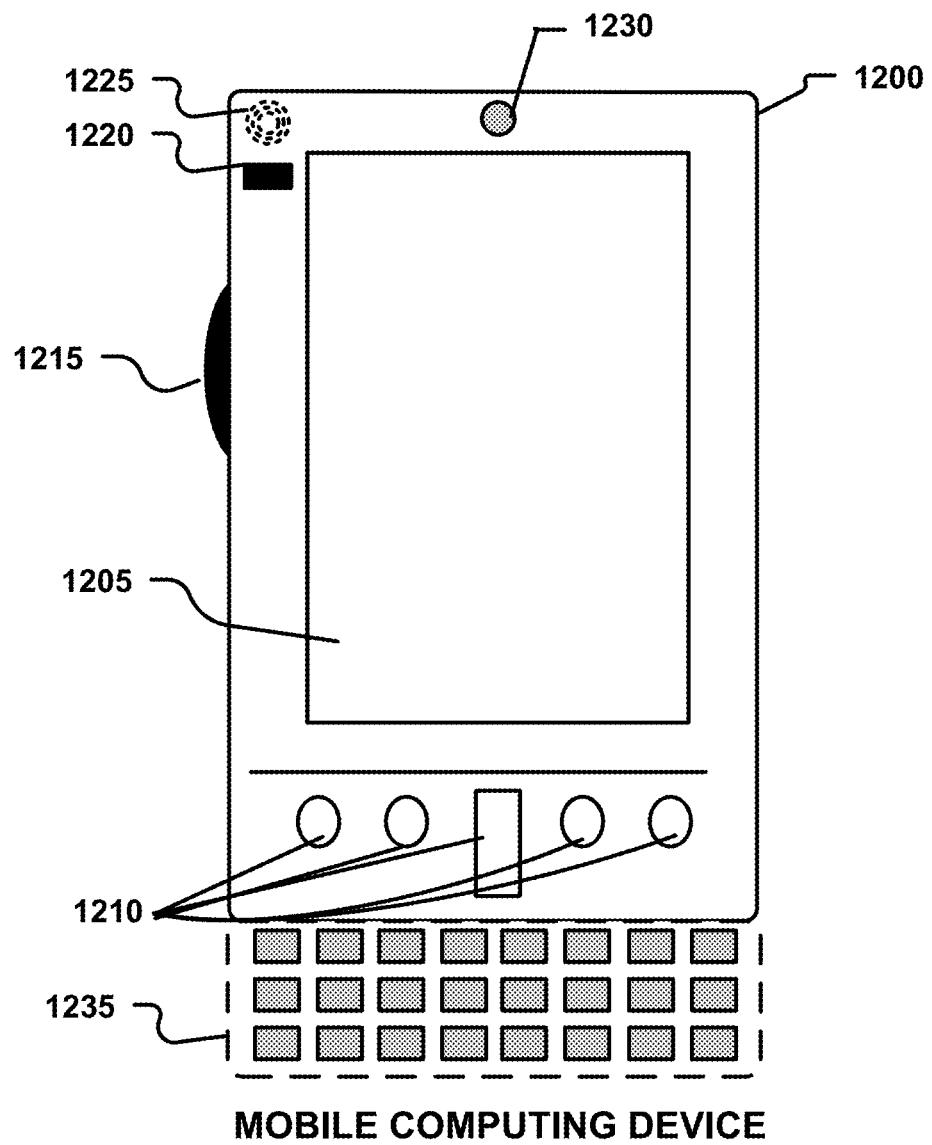
Figure 8B:
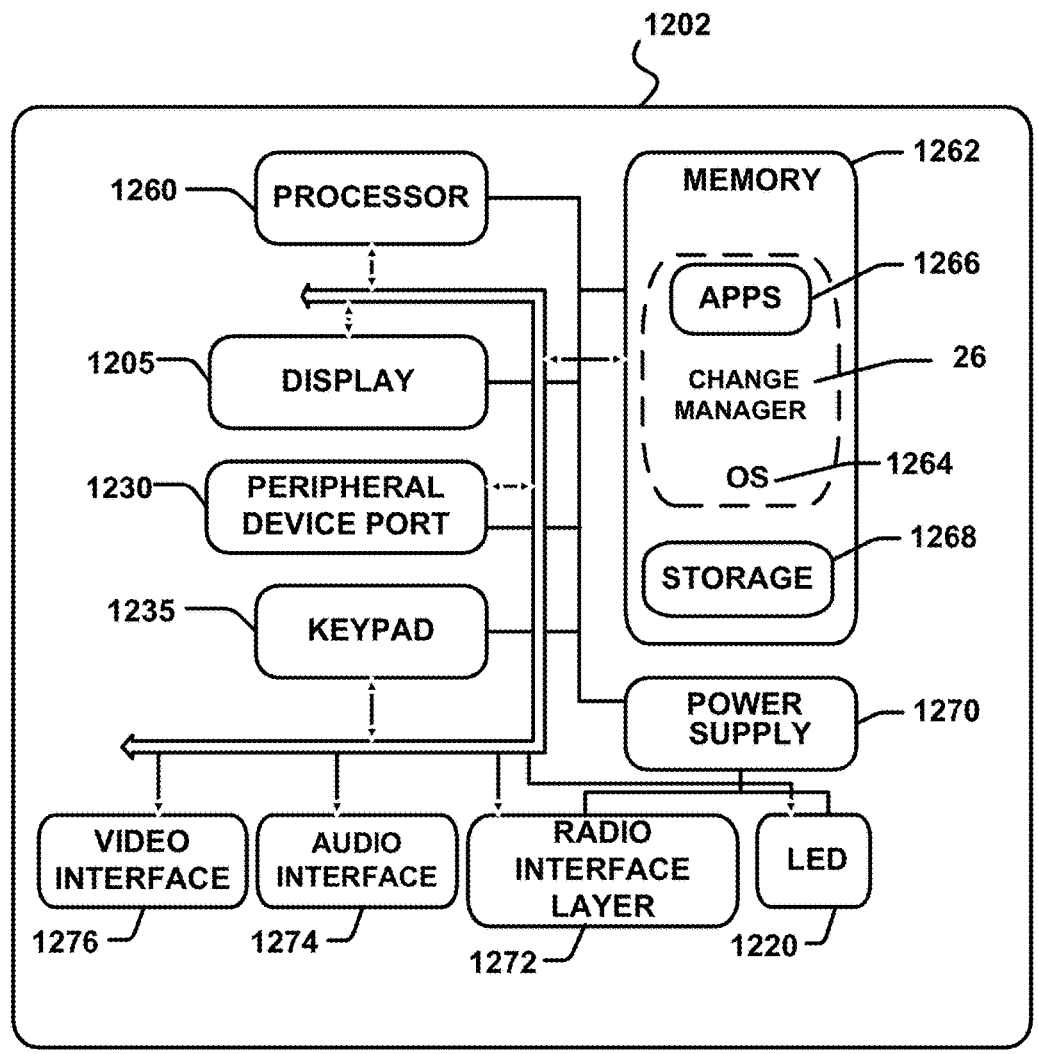
Figure 9:
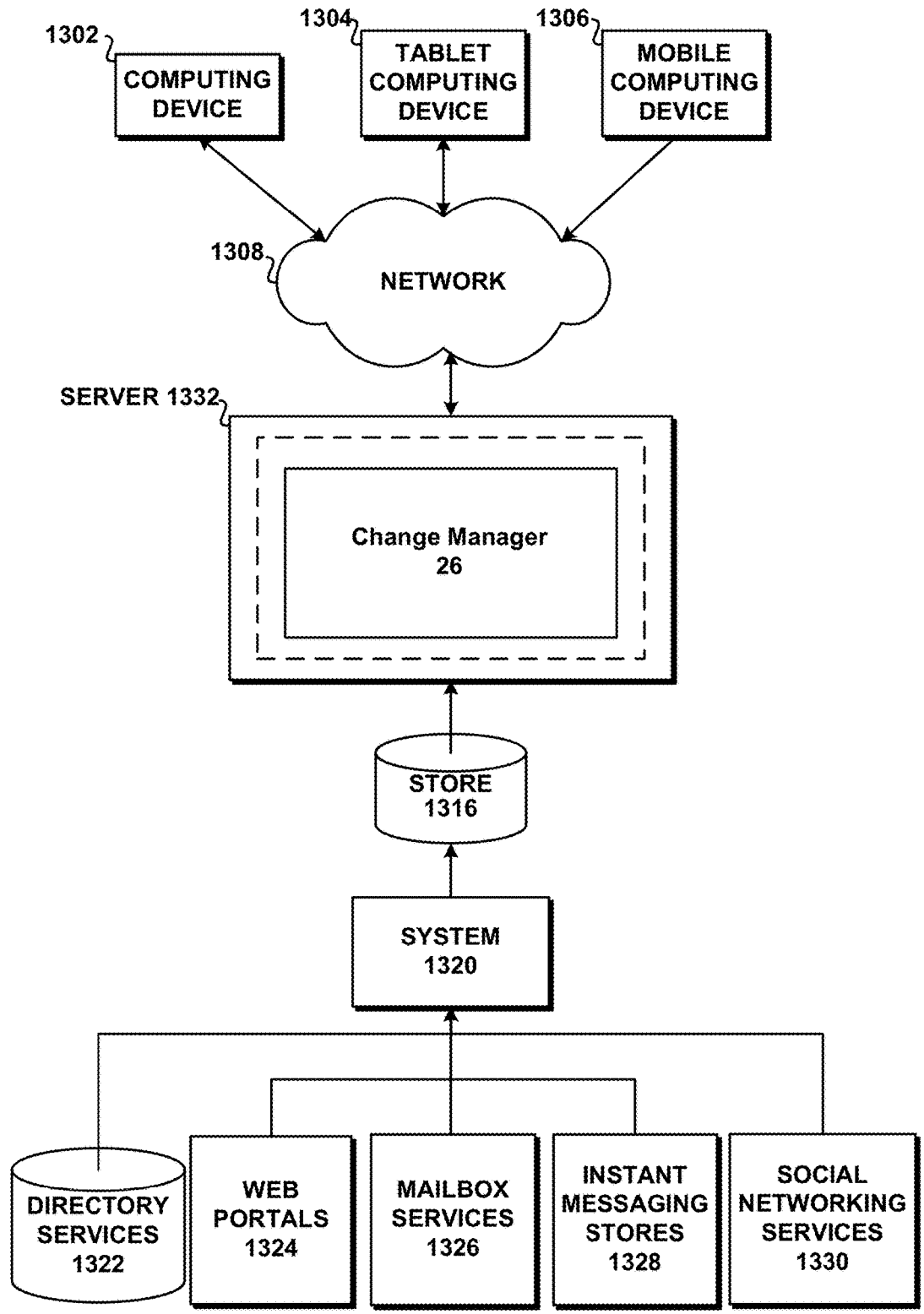

FIGS. 7, 8 and 9 and the associated descriptions provide a discussion of a variety of operating environments in which embodiments of the invention may be practiced. However, the devices and systems illustrated and discussed with respect to FIGS. 7, 8 and 9 are for purposes of example and illustration and are not limiting of a vast number of computing device configurations that may be utilized for practicing embodiments of the invention, described herein.

FIG. 7 is a block diagram illustrating example physical components of a computing device 1100 with which embodiments of the invention may be practiced. The computing device components described below may be suitable for the computing devices described above. In a basic configuration, computing device 1100 may include at least one processing unit 1102 and a system memory 1104.

Depending on the configuration and type of computing device, system memory 1104 may comprise, but is not limited to, volatile (e.g. random access memory (RAM)), non-volatile (e.g. read-only memory (ROM)), flash memory, or any combination. System memory 1104 may include operating system 1105, one or more programming modules 1106, and may include a web browser application 1120. Operating system 1105, for example, may be suitable for controlling computing device 1100's operation. In one embodiment, programming modules 1106 may include a change manager 26, as described above, installed on computing device 1100. Furthermore, embodiments of the invention may be practiced in conjunction with a graphics library, other operating systems, or any other application program and is not limited to any particular application or system. This basic configuration is illustrated in FIG. 7 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated by a removable storage 1109 and a non-removable storage 1110.

As stated above, a number of program modules and data files may be stored in system memory 1104, including operating system 1105. While executing on processing unit 1102, programming modules 1106, such as the manager may perform processes including, for example, operations related to methods as described above. The aforementioned process is an example, and processing unit 1102 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the manager 26 may be operated via application-specific logic integrated with other components of the computing device/system 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1104, removable storage 1109, and non-removable storage 1110 are all computer storage media examples (i.e., memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, etc. Output device(s) 1114 such as a display, speakers, a printer, etc. may also be included. The aforementioned devices are examples and others may be used.

A camera and/or some other sensing device may be operative to record one or more users and capture motions and/or gestures made by users of a computing device. A sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a suitable mobile computing environment, for example, a mobile telephone, a smartphone, a tablet personal computer, a laptop computer, and the like, with which embodiments of the invention may be practiced. With reference to FIG. 8A, an example mobile computing device 1200 for implementing the embodiments is illustrated. In a basic configuration, mobile computing device 1200 is a handheld computer having both input elements and output elements. Input elements may include touch screen display 1205 and input buttons 1210 that allow the user to enter information into mobile computing device 1200. Mobile computing device 1200 may also incorporate an optional side input element 1215 allowing further user input. Optional side input element 1215 may be a rotary switch, a button, or any other type of manual input element. In alternative embodiments, mobile computing device 1200 may incorporate more or less input elements. For example, display 1205 may not be a touch screen in some embodiments. In yet another alternative embodiment, the mobile computing device is a portable phone system, such as a cellular phone having display 1205 and input buttons 1210. Mobile computing device 1200 may also include an optional keypad 1235. Optional keypad 1235 may be a physical keypad or a "soft" keypad generated on the touch screen display.

Mobile computing device 1200 incorporates output elements, such as display 1205, which can display a graphical user interface (GUI). Other output elements include speaker 1225 and LED 1220. Additionally, mobile computing device 1200 may incorporate a vibration module (not shown), which causes mobile computing device 1200 to vibrate to notify the user of an event. In yet another embodiment, mobile computing device 1200 may incorporate a headphone jack (not shown) for providing another means of providing output signals.

Although described herein in combination with mobile computing device 1200, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 8B is a block diagram illustrating components of a mobile computing device used in one embodiment, such as the computing device shown in FIG. 8A. That is, mobile computing device 1200 can incorporate system 1202 to implement some embodiments. For example, system 1202 can be used in implementing a "smart phone" that can run one or more applications similar to those of a desktop or notebook computer such as, for example, spreadsheet applications, presentation applications, browser, e-mail, scheduling, instant messaging, and media player applications. In some embodiments, system 1202 is integrated as a computing device, such as an integrated personal digital assistant (PDA) and wireless phoneme.

One or more application 1266 may be loaded into memory 1262 and run on or in association with operating system 1264. Examples of application programs include phone dialer programs, e-mail programs, PIM (personal information management) programs, word processing programs, spreadsheet programs, presentation/slideshow programs, Internet browser programs, messaging programs, and so forth. System 1202 also includes non-volatile storage 1268 within memory 1262. Non-volatile storage 1268 may be used to store persistent information that should not be lost if system 1202 is powered down. Applications 1266 may use and store information in non-volatile storage 1268, such as spreadsheet content, document content, e-mail or other messages used by an e-mail application, and the like. A synchronization application (not shown) may also reside on system 1202 and is programmed to interact with a corresponding synchronization application resident on a host computer to keep the information stored in non-volatile storage 1268 synchronized with corresponding information stored at the host computer. As should be appreciated, other applications may be loaded into memory 1262 and run on the device 1200, including the change manager 26, described above.

System 1202 has a power supply 1270, which may be implemented as one or more batteries. Power supply 1270 might further include an external power source, such as an AC adapter or a powered docking cradle that supplements or recharges the batteries.

System 1202 may also include a radio 1272 that performs the function of transmitting and receiving radio frequency communications. Radio 1272 facilitates wireless connectivity between system 1202 and the "outside world," via a communications carrier or service provider. Transmissions to and from radio 1272 are conducted under control of OS 1264. In other words, communications received by radio 1272 may be disseminated to application 1266 via OS 1264, and vice versa.

Radio 1272 allows system 1202 to communicate with other computing devices, such as over a network. Radio 1272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1202 is shown with two types of notification output devices; LED 1220 that can be used to provide visual notifications and an audio interface 1274 that can be used with speaker 1225 to provide audio notifications. These devices may be directly coupled to power supply 1270 so that when activated, they remain on for a duration dictated by the notification mechanism even though processor 1260 and other components might shut down for conserving battery power. LED 1220 may be programmed to remain on indefinitely until the user takes action to indicate the powered-on status of the device. Audio interface 1274 is used to provide audible signals to and receive audible signals from the user. For example, in addition to being coupled to speaker 1225, audio interface 1274 may also be coupled to a microphone to receive audible input, such as to facilitate a telephone conversation. In accordance with embodiments of the present invention, the microphone may also serve as an audio sensor to facilitate control of notifications, as will be described below. System 1202 may further include video interface 1276 that enables an operation of on-board camera 1230 to record still images, video stream, and the like.

A mobile computing device implementing system 1202 may have additional features or functionality. For example, the device may also include additional data storage devices (removable and/or non-removable) such as, magnetic disks, optical disks, or tape. Such additional storage is illustrated in FIG. 8B by storage 1268. Computer storage media may include volatile and nonvolatile, removable and non-removable media implemented in any method or technology for storage of information, such as computer readable instructions, data structures, program modules, or other data.

Data/information generated or captured by the device 1200 and stored via the system 1202 may be stored locally on the device 1200, as described above, or the data may be stored on any number of storage media that may be accessed by the device via the radio 1272 or via a wired connection between the device 1200 and a separate computing device associated with the device 1200, for example, a server computer in a distributed computing network such as the Internet. As should be appreciated such data/information may be accessed via the device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 9 illustrates a system architecture for a system as described herein.

Components managed via the change manager 26 may be stored in different communication channels or other storage types. For example, components along with information from which they are developed may be stored using directory services 1322, web portals 1324, mailbox services 1326, instant messaging stores 1328 and social networking sites 1330. The systems/applications 26, 1320 may use any of these types of systems or the like for enabling management and storage of components in a store 1316. A server 1332 may provide communications and services relating to the tweak and view mode as described herein. Server 1332 may provide services and content over the web to clients through a network 1308. Examples of clients that may utilize server 1332 include computing device 1302, which may include any general purpose personal computer, a tablet computing device 1304 and/or mobile computing device 1306 which may include smart phones. Any of these devices may obtain display component management communications and content from the store 1316.

Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for visualizing proposed changes to content of a spreadsheet within a spreadsheet application, comprising:
   displaying a spreadsheet having data that is in a first version state;
   receiving a proposed change, via a user interface of the spreadsheet application, that changes the data to a second version state in the spreadsheet;
   determining that the proposed change will affect the result of a calculation within the spreadsheet and will affect a graphical display of the spreadsheet application, the graphical display generated based on the data of the spreadsheet;
   receiving an indication to view the affected calculation and/or affected graphical display as a result of the proposed change;
   replacing the displayed spreadsheet with a display of at least one affected calculation result or at least one affected graphical display;
   maintaining the first version state of the data until receiving an indication, via the user interface of the spreadsheet application, to commit the proposed change to the spreadsheet; and
   when the proposed change is committed, displaying the view of the spreadsheet with the data in the second version state as committed data.

2. The method of claim 1, further comprising receiving a request to enter a tweak and view mode before receiving the proposed change, entrance into the tweak and view mode indicating that the first version state of the data is maintained while allowing proposed changes to be made to the data of the spreadsheet.

3. The method of claim 1, wherein replacing the displayed view of the spreadsheet with the display of at least one affected calculation result or at least one affected graphical display includes additionally displaying a corresponding calculation result or corresponding graphical display prior to being affected by the proposed change.

4. The method of claim 1, wherein replacing the displayed view of the spreadsheet with the display of at least one affected calculation result or at least one affected graphical display, includes replacing the displayed view of the spreadsheet with a plurality of thumbnails representative of the portions of the spreadsheet that are affected by the proposed change including the plurality of affected calculation results and the plurality of affected graphical displays.

5. The method of claim 4, further comprising determining an ordering of the plurality of affected calculation results and/or the plurality of affected graphical displays and displaying each of the plurality of affected calculation results and/or the plurality of affected graphical displays in the determined order.

6. The method of claim 4, further comprising advancing one-by-one through each of the plurality of thumbnail images in response to receiving an advance command via the user interface of the spreadsheet application.

7. The method of claim 1, wherein receiving the proposed change to the spreadsheet comprises receiving proposed changes to a plurality of different cells of the spreadsheet.

8. The method of claim 1, wherein when the proposed change is indicated as not committed, via the user interface of the spreadsheet application, replacing the display of the at least one affected calculation result or the display of the at least one affected graphical display with a display of the spreadsheet.

9. The method of claim 1, wherein the displaying the spreadsheet comprises displaying the spreadsheet on a display device of a mobile computing device.

10. A computer-readable medium storing computer-executable instructions for visualizing proposed changes to content of a spreadsheet within a spreadsheet application, comprising:
- displaying a spreadsheet having data that is in a first version state;
- receiving a proposed change, via a user interface of the spreadsheet application, that changes the data to a second version state in the spreadsheet;
- determining that the proposed change will affect the result of a calculation within the spreadsheet and will affect a graphical display of the spreadsheet application, the graphical display generated based on the data of the spreadsheet;
- receiving an indication, via a user interface of the spreadsheet application, to view the affected calculation and/or affected graphical display as a result of the proposed change;
- replacing the displayed spreadsheet with a display of at least one affected calculation result or at least one affected graphical display;
- maintaining the first version state of the data until receiving an indication, via the user interface of the spreadsheet application, to commit the proposed change to the spreadsheet; and
- when the proposed change is committed, displaying the view of the spreadsheet with the data in the second version state as committed data.

11. The computer-readable medium of claim 10, replacing the displayed view of the spreadsheet with the display of at least one affected calculation result or at least one affected graphical display includes additionally displaying a corresponding calculation result or corresponding graphical display prior to being affected by the proposed change.

12. The computer-readable medium of claim 10, wherein replacing the displayed view of the spreadsheet with the display of at least one affected calculation result or at least one affected graphical display, includes replacing the displayed view of the spreadsheet with a plurality of thumbnails representative of the portions of the spreadsheet that are affected by the proposed change including the plurality of affected calculation results and the plurality of affected graphical displays.

13. The computer-readable medium of claim 12, further comprising advancing one-by-one through each of the plurality of thumbnail images in response to receiving an advance command via the user interface of the spreadsheet application.

14. The computer-readable medium of claim 12, further comprising determining an ordering of the plurality of affected calculation results and/or the plurality of affected graphical displays and displaying each of the plurality of affected calculation results and/or the plurality of affected graphical displays in the determined order.

15. A system for visualizing proposed changes to content of a spreadsheet, comprising:
- a display that is configured to receive touch input;
- a processor and memory;
- an operating environment and a spreadsheet application executing using the processor;
- a display showing content; and
- the processor executing instructions stored in memory causing the processor to operate as a change manager that is configured to perform actions comprising:
  - displaying a view of spreadsheet data in a first version state that is associated with a workbook including one or more sheets;
  - receiving a proposed change, via a user interface of the spreadsheet application, that changes the spreadsheet data to a second version state in the spreadsheet;
  - determining that the proposed change will affect the result of a calculation within the spreadsheet and will affect a graphical display of the spreadsheet application, the graphical display generated based on the data of the spreadsheet;
  - receiving an indication, via a user interface of the spreadsheet application, to view the affected calculation and/or affected graphical display as a result of the proposed change;
  - replacing the displayed view of the spreadsheet with a display of at least one affected calculation result or at least one affected graphical display;
  - maintaining the first version state of the spreadsheet data until receiving an indication, via the user interface of the spreadsheet application, to commit the proposed change to the spreadsheet data; and
  - when the proposed change is committed, displaying the view of the spreadsheet with the data in the second version state as committed data.

16. The system of claim 15, wherein replacing the displayed view of the spreadsheet with the display of at least one affected calculation result or at least one affected graphical display includes additionally displaying a corresponding calculation result or corresponding graphical display prior to being affected by the proposed change.

17. The system of claim 15, wherein replacing the displayed view of the spreadsheet with the display of at least one affected calculation result or at least one affected graphical display, includes replacing the displayed view of the spreadsheet with a plurality of thumbnails representative of the portions of the spreadsheet that are affected by the proposed change including the plurality of affected calculation results and the plurality of affected graphical displays.

18. The system of claim 17, further comprising advancing one-by-one through each of the plurality of thumbnail images in response to receiving an advance command via the user interface of the spreadsheet application.

* * * * *